United States Patent
Kobayashi et al.

(10) Patent No.: US 7,091,684 B2
(45) Date of Patent: Aug. 15, 2006

(54) ELECTRIC POWER STEERING APPARATUS

(75) Inventors: Hideyuki Kobayashi, Gunma (JP); Yusuke Itakura, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 11/191,995

(22) Filed: Jul. 29, 2005

(65) Prior Publication Data
US 2006/0022626 A1    Feb. 2, 2006

(30) Foreign Application Priority Data
Aug. 2, 2004    (JP)    ............................. 2004-225120

(51) Int. Cl.
*H02P 7/00*    (2006.01)
(52) U.S. Cl. ...................... 318/432; 318/434; 318/139; 318/609; 318/610
(58) Field of Classification Search ................ 318/432, 318/434, 139, 609, 610
See application file for complete search history.

(56) References Cited

U.S. PATENT DOCUMENTS

| | | | | |
|---|---|---|---|---|
| 5,912,539 A | * | 6/1999 | Sugitani et al. ............. | 318/434 |
| 5,927,430 A | * | 7/1999 | Mukai et al. ................ | 180/446 |
| 6,026,926 A | * | 2/2000 | Noro et al. .................. | 180/446 |
| 6,070,692 A | * | 6/2000 | Nishino et al. ............. | 180/443 |
| 6,727,669 B1 | * | 4/2004 | Suzuki et al. ............... | 318/139 |
| 6,913,109 B1 | * | 7/2005 | Kodama et al. ............ | 180/446 |

FOREIGN PATENT DOCUMENTS

| | | |
|---|---|---|
| EP | 0 535 423 A1 | 4/1993 |
| JP | 10-167086 A | 6/1998 |
| JP | 11-49002 A | 2/1999 |
| JP | 2002-87304 A | 3/2002 |
| JP | 2002-234457 A | 8/2002 |

* cited by examiner

*Primary Examiner*—Rita Leykin
(74) *Attorney, Agent, or Firm*—Sughrue Mion, PLLC (57) ABSTRACT

An object of the present invention is to provide an electric power steering apparatus which can continue control even if some of current detectors that detect phase currents of a three-phase motor break down. Phase currents of the failure current detectors are calculated by using detected signals from the normal current detectors, and the electric power steering apparatus can be continued to be controlled by using the current values.

6 Claims, 8 Drawing Sheets

FIG.1

PRIOR ART

FIG.2

PRIOR ART

ELECTRIC POWER STEERING APPARATUS

BACKGROUND OF THE INVENTION

1. Field of the Invention

The present invention relates to an electric power steering apparatus, and particularly relates to the electric power steering apparatus which is capable of being continuously operated even if a current detector for detecting a motor current breaks down.

2. Prior Art

Electric power steering apparatuses, that assist steering devices of automobiles and vehicles by means of torque of motors, apply driving forces of motors as assist forces to steering shafts or rack shafts by means of transmission mechanisms such as gears or a belt via reduction gears. Since such conventional electric power steering apparatuses generate assist torque (steering assist torque) accurately, motor current is controlled to be feed-backed. The feedback control is for adjusting a motor applying voltage so that a difference between a current control value and a motor current detected value becomes small or zero, and the motor applying voltage is adjusted generally by adjusting a duty ratio of PWM (pulse width modulation) control.

Figure 1:
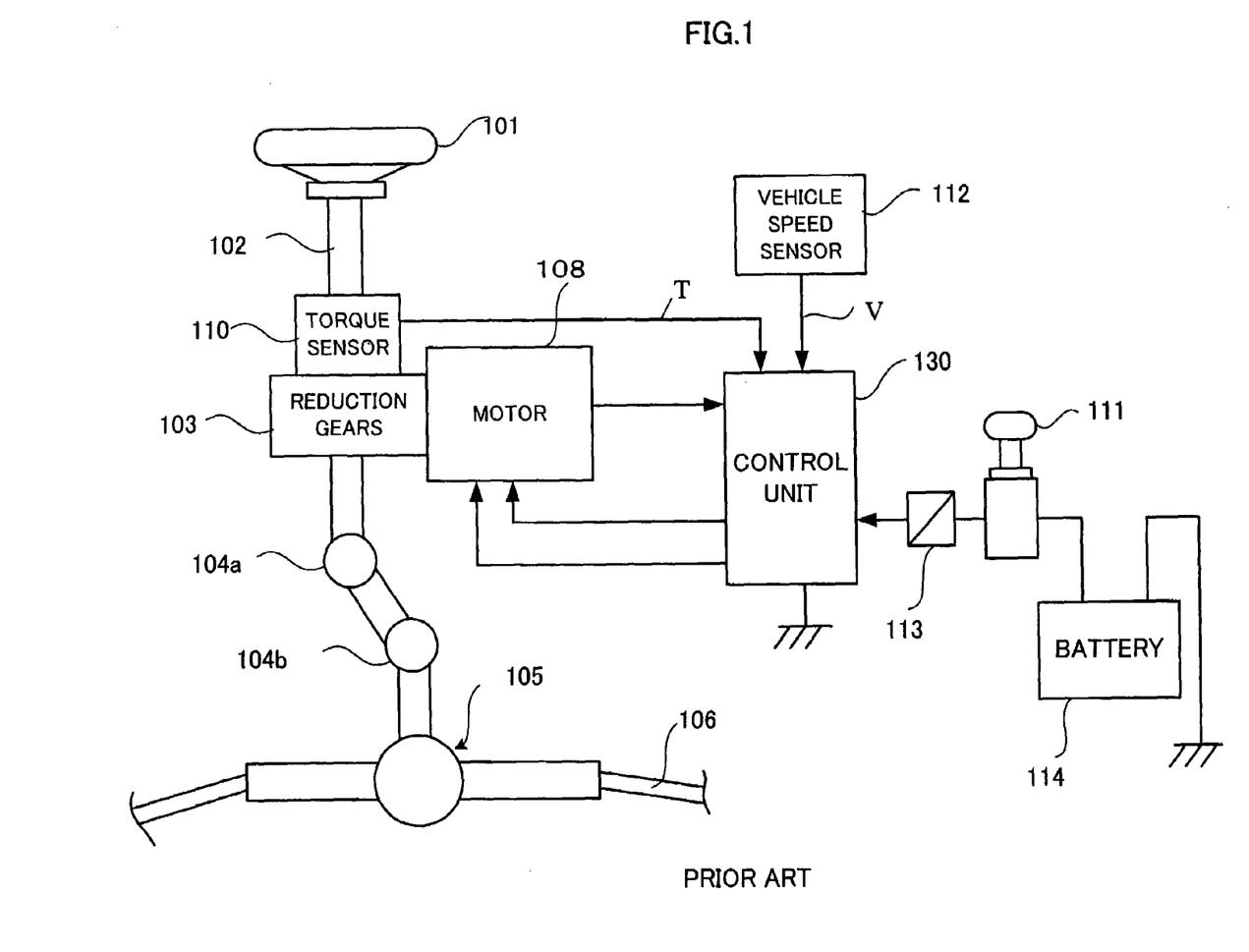
FIG. 1 is a constitutional diagram of a conventional electric power steering apparatus.

A general constitution of the electric power steering apparatus is explained with reference to FIG. 1. A shaft 102 of a steering handle 101 is joined to a tie rod 106 of a steering wheel via reduction gears 103, universal joints 104a and 104b and a pinion rack mechanism 105. The shaft 102 is provided with a torque sensor 110 that detects steering torque of the steering handle 101, and a motor 120 that assists a steering power of the steering handle 101 is connected to the shaft 102 via the reduction gears 103. An electric power is supplied from a battery 114 via an ignition key 111 and a power source relay 113 to a control unit 130 that controls the power steering apparatus. The control unit 130 calculates a current command value Iref of an assist command based on a steering torque T detected by the torque sensor 110 and a vehicle speed V detected by a vehicle speed sensor 112, and controls an electric current to be supplied to a motor 108 based on the calculated current command value Iref.

Figure 2:
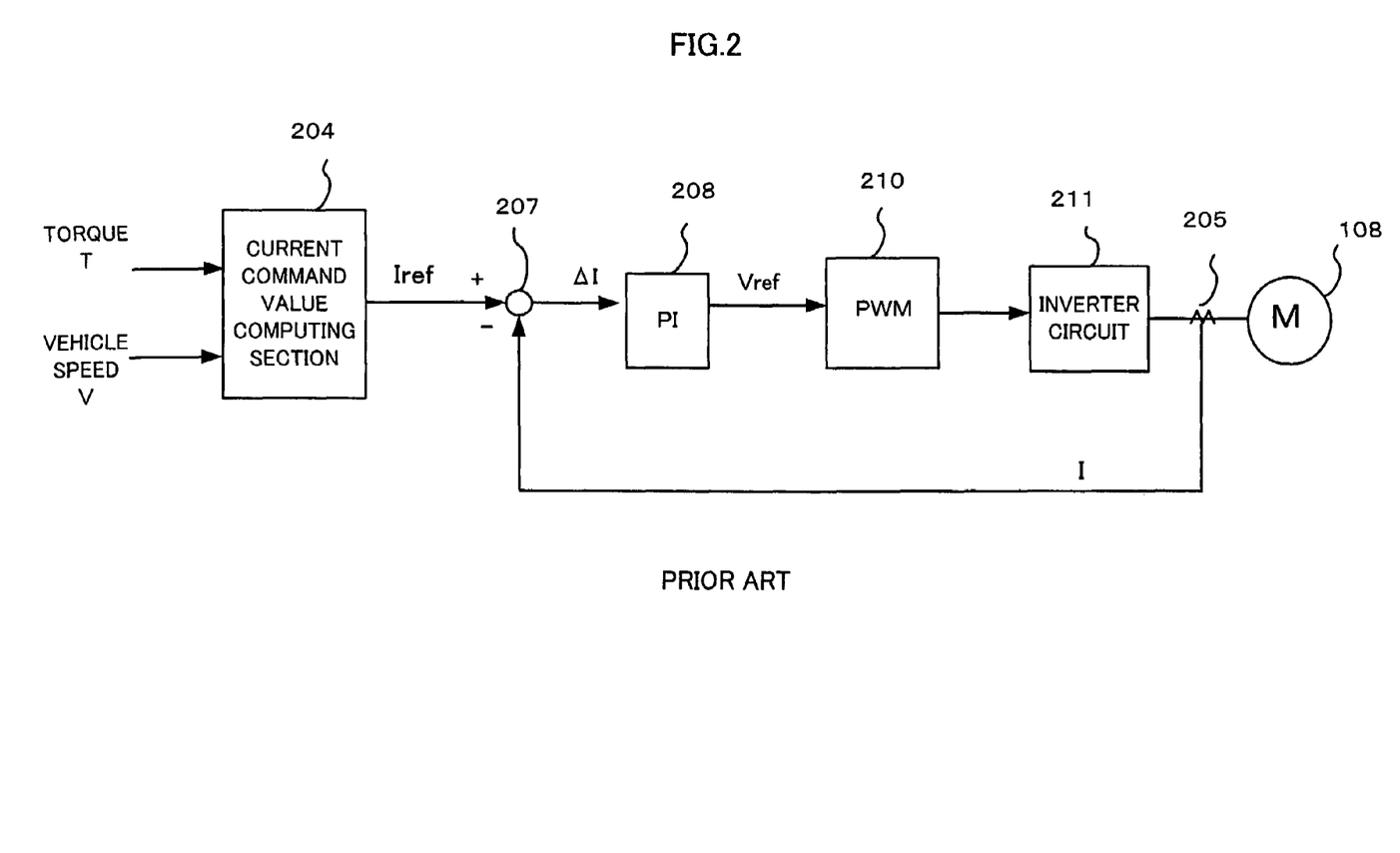
FIG. 2 is a block diagram showing an example of a feed-back control system of the electric power steering apparatus.

The control unit 130 is composed of mainly a CPU (including a micro processor unit or a micro controller unit), and a general function which is executed by a program in the CPU is shown in FIG. 2. For example, FIG. 2 does not show a current command value computing unit as hardware independent from a current command value computing section 204, but shows a current command value computing function to be executed in the CPU.

The function and the operation of the control unit 130 are explained. The steering torque T which is detected by the torque sensor 110 and is inputted and the vehicle speed V detected by the vehicle speed sensor 112 are inputted into the current command value computing section 204, so that the current command value Iref is calculated. On the other hand, a motor current I detected by a current detector 205 is feed-backed to a subtracting section 207, and a deviation "ΔI=Iref−I" from the current command value Iref is calculated. The deviation ΔI is inputted into a proportional-integral control section (PI control section) 208 as one example of a current controller, and a voltage command value Vref is calculated. A PWM control section 210 inputs the voltage command value Vref therein, and transmits a PWM signal determined based on the voltage command value Vref to an inverter circuit 211. The inverter circuit 211 supplies a motor current I to the motor 108 based on the PWM signal.

The above explains a basic control system of the feed-back control with respect to the motor of the electric power steering apparatus. In the feed-back control, it is an important requirement that the motor current can be correctly detected. As vehicles become larger, however, handle steering by a human power is more difficult, and thus even if the current detector breaks down, it is desired that the assist of the electric power steering apparatus is continued. In the case where the current detector breaks down, therefore, a control system that switches the control into a feed-forward control without using the motor current detected by the current detector so as to continue the assist of the handle steering is used as the control system that continues the assist as disclosed in Japanese Patent Application Laid-open No. 10-167086 A, Japanese Patent Application Laid-open No. 11-49002 A and Japanese Patent Application Laid-open No. 2002-87304 A.

The conventional control system for continuing the assist, however, relinquishes the feed-back control and switches the control into feed-forward control, but the feed-forward control has problems that the feeling of steering is inferior and an excess current which is not less than rated current might flow in the motor or the like in comparison with the feed-back control.

SUMMARY OF THE INVENTION

The present invention is devised from the above viewpoint, and an object of the present invention is to provide a safe electric power steering apparatus in which even if a current detector breaks down, assist can be continued according to the safe feed-back control with good feeling of steering and even if the control is switched into a feed-forward control, an electric current which is less than rated current does not flow.

The present invention is an electric power steering apparatus which includes a three-phase motor that supplies a steering assist power to a vehicle steering system, a torque sensor that detects a steering power to affect a handle, and at least two current detectors that detect phase currents of the three-phase motor, and controls an electric current of the three-phase motor based on a current command value determined based on an output value from the torque sensor and the electric current of the three-phase motor. The object of the present invention is achieved by having a current detector defect specifying section that specifies a failure current detector and a normal current detector when the current detector breaks down, and a first current calculating section that calculates the phase currents of the three-phase motor from a detected current for one phase detected by the normal current detector, and in that the electric current of the motor is continued to be controlled based on the calculated phase currents.

The above object is achieved more effectively in that the first current calculating section includes a three-phase/two-phase converting section that inputs the detected current for one phase detected by the normal current detector and an estimated current for at least one phase which is substituted for a detected current of the failure current detector therein, two low pass filters that are arranged at an output of the three-phase/two-phase converting section and a two-phase/three-phase converting section that inputs the outputs from the low pass filters therein, and an electric current corresponding to the estimated current in the three-phase currents as an output from the two-phase/three-phase converting section is feed-backed as the estimated current.

The present invention is an electric power steering apparatus which includes a three-phase motor that supplies a steering assist power to a vehicle steering system, a torque sensor that detects a steering power to affect a handle and at least two current detectors that detect phase currents of the three-phase motor, and controls an electric current of the three-phase motor based on a current command value determined based on an output value from the torque sensor and the electric current of the three-phase motor. The above object of the present invention is achieved by having a battery current detector that detects an electric current to be supplied from a battery power source for driving the three-phase motor; and a second current calculating section that calculates the phase currents of the three-phase motor from the battery current, and in that the electric current of the three-phase motor is controlled based on the calculated phase currents for three phases.

Further, the above object is achieved more effectively in that the second current calculating section is a two-phase/three-phase converting section that inputs a q-axis current as the battery current and a d-axis current as zero current therein.

The present invention is an electric power steering apparatus which includes a three-phase motor that supplies a steering assist power to a vehicle steering system, a torque sensor that detects a steering power to affect a handle and at least two current detectors that detect phase currents of the motor, and controls an electric current of the motor to be feed-backed based on the current command value determined based on an output value from the torque sensor and the electric current of the three-phase motor. The above object is achieved by having a battery current detector that detects an electric current to be supplied from a battery power source for driving the three-phase motor, and in that when a determination is made that not all the current detectors of the three-phase motor and the battery current detector are normal, the feed-back control is switched into a feed-forward control based on the current command value.

Further, the above object is achieved more effectively in that the feed-forward control is made, a maximum output current value is limited to be smaller than a maximum output current value of the three-phase motor in the case where the phase currents of the three-phase motor are detected by the current detectors and are controlled to be feed-backed.

DESCRIPTION OF THE PREFERRED EMBODIMENTS

The present invention is characterized in that even if some current detectors break down, each phase current can be calculated from electric currents detected by the residual current detectors, and control of an electric power steering apparatus is continued based on the calculated phase currents. Embodiments are explained below with reference to drawings.

Embodiment-1

An embodiment-1 is explained with reference to FIG. 3. The basic of feed-back control in the electric power steering apparatus is firstly explained, and then a main section of the present invention is explained.

A torque T detected by a torque sensor 110 and a vehicle speed V detected by a vehicle speed sensor 112 are inputted into a current command value computing section 204, and current command values of respective phases Iaref, Ibref and Icref are calculated. On the other hand, a current detector 205-1 detects an a-phase current Ia of a three-phase motor 108, and a current detector 205-2 detects a c-phase current Ic. When the current detectors 205-1 and 205-2 do not breakdown, ab-phase current Ib is calculated as $Ib=-(Ia+Ic)$, and the detected currents Ia, Ib and Ic are respectively feed-backed to subtracting sections 207-1, 207-2 and 207-3 so as to be calculated as deviations $\Delta Ia=Iaref-Ia$, $\Delta Ib=Ibref-Ib$ and $\Delta Ic=Icref-Ic$.

The phase deviations $\Delta Ia$, $\Delta Ib$ and $\Delta Ic$ are inputed into a PI control section 208, and phase voltage command values Varef, Vbref and Vcref are outputted. A PWM control section 210 inputs the phase voltage command values Varef, Vbref and Vcref thereinto, and transmits PWM signals which are determined based on the phase voltage command values Varef, Vbref and Vcref to an inverter circuit 211. The inverter circuit 211 supplies motor currents Ia, Ib and Ic to the three-phase motor 108 based on the PWM signals.

An electric power is supplied from a battery power source 114 to the inverter circuit 211, and a battery current Idc is detected by a battery current detector 18. In FIG. 3, a battery current detector 18-2 which is provided to an outflow side of the battery power source 114, and a battery current detector 18-1 which is provided on an inflow side of the battery power source 114 are present here, but any one of them may be provided. In this embodiment-1, the case where the battery current detector 18-1 is provided is explained. The explanation refers to the basic of the feed-back control in the electric power steering apparatus.

The feed-back control in the case where the c-phase current detector 205-2 breaks down is explained here as one example. The detected current Ia from the current detector 205-1, the detected current Ic from the current detector 205-2, and the electric currents Ia, Ic and Idc detected by the battery current detector 18-1 are inputted into a current detector failure specifying section 10, so that one of the current detectors 205-1, 205-2 and 18-1 which breaks down is specified. The specifying method includes, for example, a method of comparing a motor current value detected by the current detector with a motor current value calculated from a current command value for each phase so as to specify a failure or defect disclosed in Japanese Patent Application Laid-Open No. 2002-234457 A.

In another method, the current detector which breaks down or failure can be certainly specified by utilizing a characteristic that the battery current Idc is supplied from the battery power source 114 via any one of passages of the phase motor currents Ia, Ib and Ic. For example, if the battery current Idc flows as the a-phase current Ia into the three-phase motor 108 and is returned as the c-phase current Ic to the battery power source 114, a relationship that Idc=Ia=−Ic is established in a certain mode of a switching mode of the inverter circuit 211. In another way, if the battery current Idc flows as the a-phase current Ia into the three-phase motor 108 and is returned to the battery power source 114 via the b-phase current Ib and the c-phase current Ic, a relationship that Idc=Ia=−(Ib+Ic) is established. The current detector which breaks down or failure can be specified by utilizing these relationships.

In another simple method, when the detected currents are maintained to be the maximum current values or "0" currents for a long time and thus they do not change, that current detector can be specified as a failure detector. This method has a disadvantage that a determining time for specifying a failure current detector becomes longer.

The following explains a unit that calculates the phase currents ia, ib and ic based on the a-phase current Ia detected by the a-phase current detector 205-1 when the c-phase current detector 205-2 breaks down so as not to detect the c-phase current Ic accurately. Firstly, the current detector specifying section 10 specifies that the current detector 205-2 breaks down.

Figure 3:
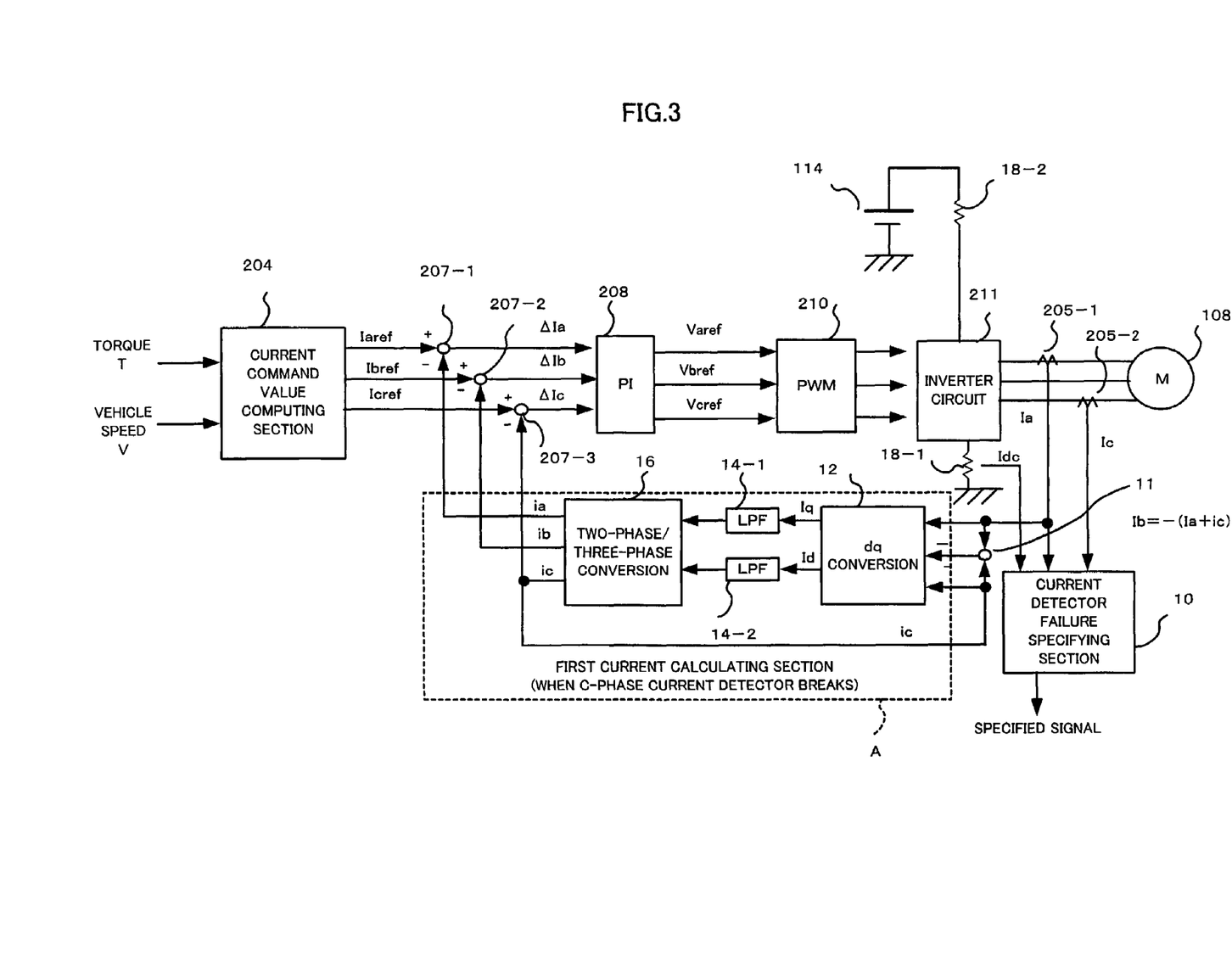
FIG. 3 is a block diagram illustrating each phase feed-back control according to one embodiment of the present invention.

The a-phase current Ia detected by the a-phase current detector 205-1 specified as normal by the current detector failure specifying section 10 based on a specified signal from the current detector failure specifying unit 10 is inputted into a first current calculating section A surrounded by a broken line in FIG. 3. The respective phase currents ia, ib and ic are calculated based on the a-phase current Ia.

The first current calculating section A is constituted so that a three-phase/two-phase converting section 12 as a three-phase/two-phase converting means which inputs the a-phase current Ia detected by the current detector 205-1 therein is arranged. An initial value of the b-phase current Ib as a residual input of the three-phase/two-phase converting section 12 and an initial value of ic as an estimated current of the c-phase current Ic are set to zero as temporary current value. Initial values of Id and Iq are also set as zero. Low pass filters (LPF) 14-1 and 14-2, into which a q-axis current Iq and a d-axis current Id as outputs from the three-phase/two-phase converting section 12 are inputted are arranged. The q-axis current Iq and the d-axis current Id via the low pass filters 14-1 and 14-2 are inputted into a two-phase/three-phase converting section 16 as a two-phase/three-phase converting means, and the respective calculated phase currents ia, ib and ic are outputted. The c-phase calculated current ic is feed-backed as the estimated current so as to be inputted into the three-phase/two-phase converting section 12, and the estimated current ic is inputted instead of the c-phase detected current Ic. On the other hand, the b-phase current Ib is calculated by a code reverse adding section 11 according to an operation (Ib=−(Ia+Ic)).

The reason why the first current calculating section A can calculates the phase currents ia, ib and ic correctly is that the three-phase motor currents Ia, Ib and Ic are signals with the same frequency band as an electrical angular speed of the motor 108, but the d-q axes currents Id and Iq are direct currents which can be treated similarly to a Dc motor regardless of the electrical angle and have the same frequency band as a torque command value Tref. The d-axis current Id and the q-axis current Iq change more slowly than the three-phase currents, and thus they can be considered to have constant values for a short time. The a-phase current Ia as detected value and the c-phase current ic as calculated value before one sample (for example, 250 μs) are, therefore, inputted so that the d-axis current Id and the q-axis current Iq are calculated, and they are allowed to pass through the low pass filters so as to be smoothed and are converted into the three-phase currents so that the respective phase currents ia, ib and ic can be calculated.

Just after switching into alternative control, a transient phenomenon occurs, but when the motor rotates once at the electrical angle (about 3° at handle steering), the detected values approximately coincide with the calculated values. For this reason, the control of the electric power steering apparatus does not have any trouble. Instead of the detected currents Ia, Ib and Ic in the case where the current detector 205-2 is normal, the phase currents Ia, Ib and Ic calculated in such a manner are respectively inputted into the subtracting sections 207-1, 207-2 and 207-3, and thus the feed-back control can be continued.

Figure 4:
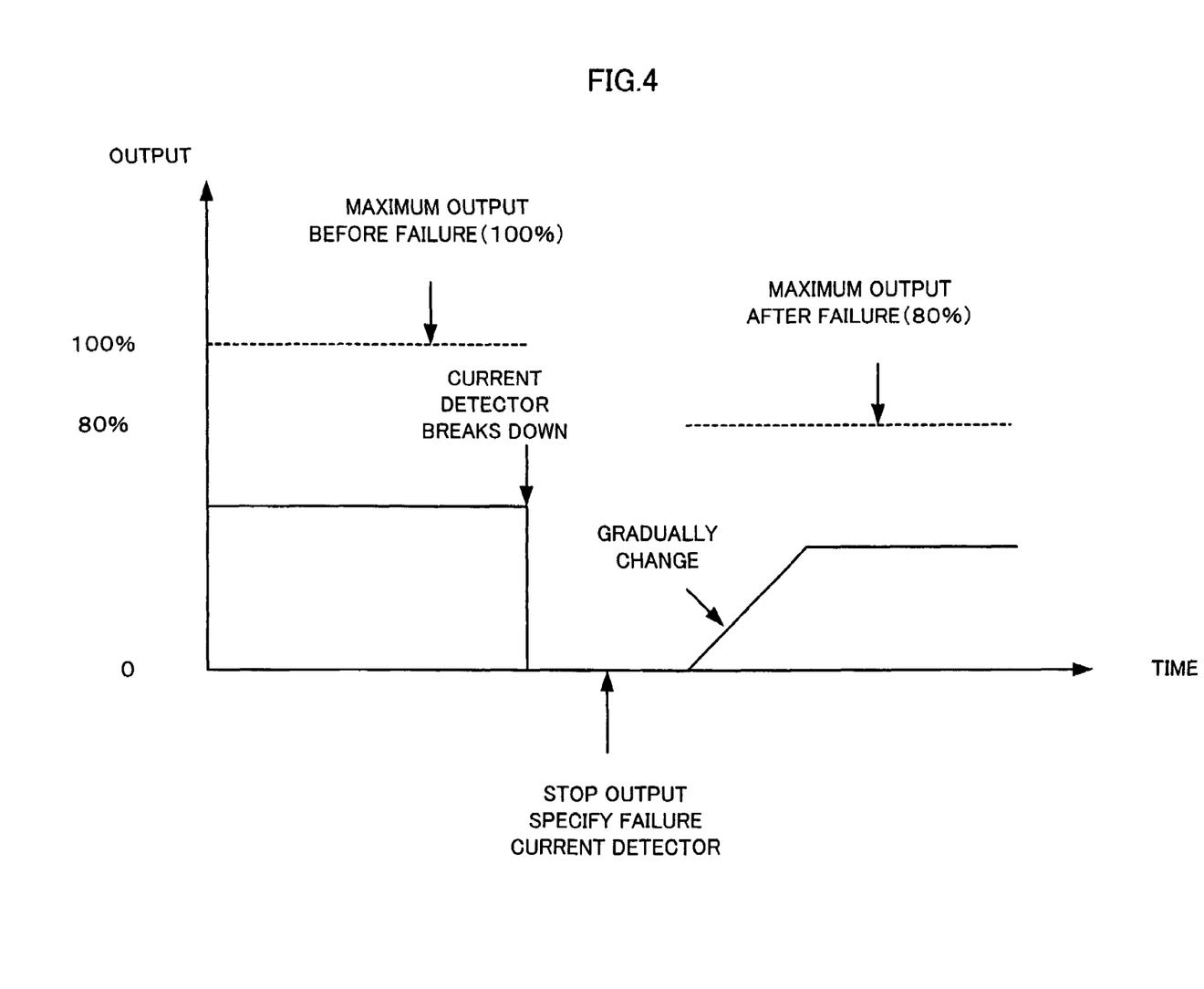
FIG. 4 is a characteristic diagram illustrating a motor output before and after a failure of a current detector according to an embodiment of the present invention.

The control of the output from the motor in the case where the c-phase current detector 205-2 breaks down and the feed-back control is made only by the detected current Ia of the a-phase current detector is explained with reference to FIG. 4. In FIG. 4, if, for example, the output from the motor is about 50% of the maximum output until the current detector 205-2 breaks down, when the current detector 205-1 breaks down, the output is once set to be zero for safety, and a failure current detector is specified for this time. When the current detector 205-2 can be specified as a failure current detector, the first current calculating section A calculates the phase currents based on the detected current Ia from the current detector 205-1 as the normal current detector so that the feed-back control is restarted.

In this case, the output is gradually increased. This is because since the assist of the electric power steering apparatus is once stopped, it is dangerous for handle steering that large assist is suddenly applied. In the case where the feed-back control is made by means of the calculated phase currents, or in the case where the c-phase current detector 205-2 breaks down and the c-phase current Ic is used also for protecting an excess current, a part of a protecting means lacks and this is dangerous. For this reason, when the maximum output is limited to about 80% as one example with respect to 100% output in the case where the current detector is normal, an excess current can be prevented and this is safe.

As a result, even if the c-phase current detector breaks down, when the a-phase current detector is normal, the feed-back control can be continued, and the safe electric power steering apparatus with the comparatively satisfactory feeling of the steering can be provided.

Further, the reason why the output from the electric power steering apparatus is once set to zero is that the defect of the electric power steering apparatus is notified to a driver by uncomfortable feeling of the handle steering at the time when the output is zero, and thus the driver is urged to have the defective electric power steering apparatus repaired in repair plant.

This embodiment-1 explains the case where the c-phase current detector 205-2 breaks down, but it goes without saying that the present invention can be applied similarly to the case where the a-phase current detector 205-1 breaks down. When one detector breaks down in the case three current detectors are provided for respective phases of the three-phase motor, respectively, the other normal two phase detected currents are calculated according to the relational expression (Ia+Ib+Ic=0) so that the control is continued. When two current detectors break down, and one normal current detector remains, the present invention is applied so that the control can be continued.

Figure 5:
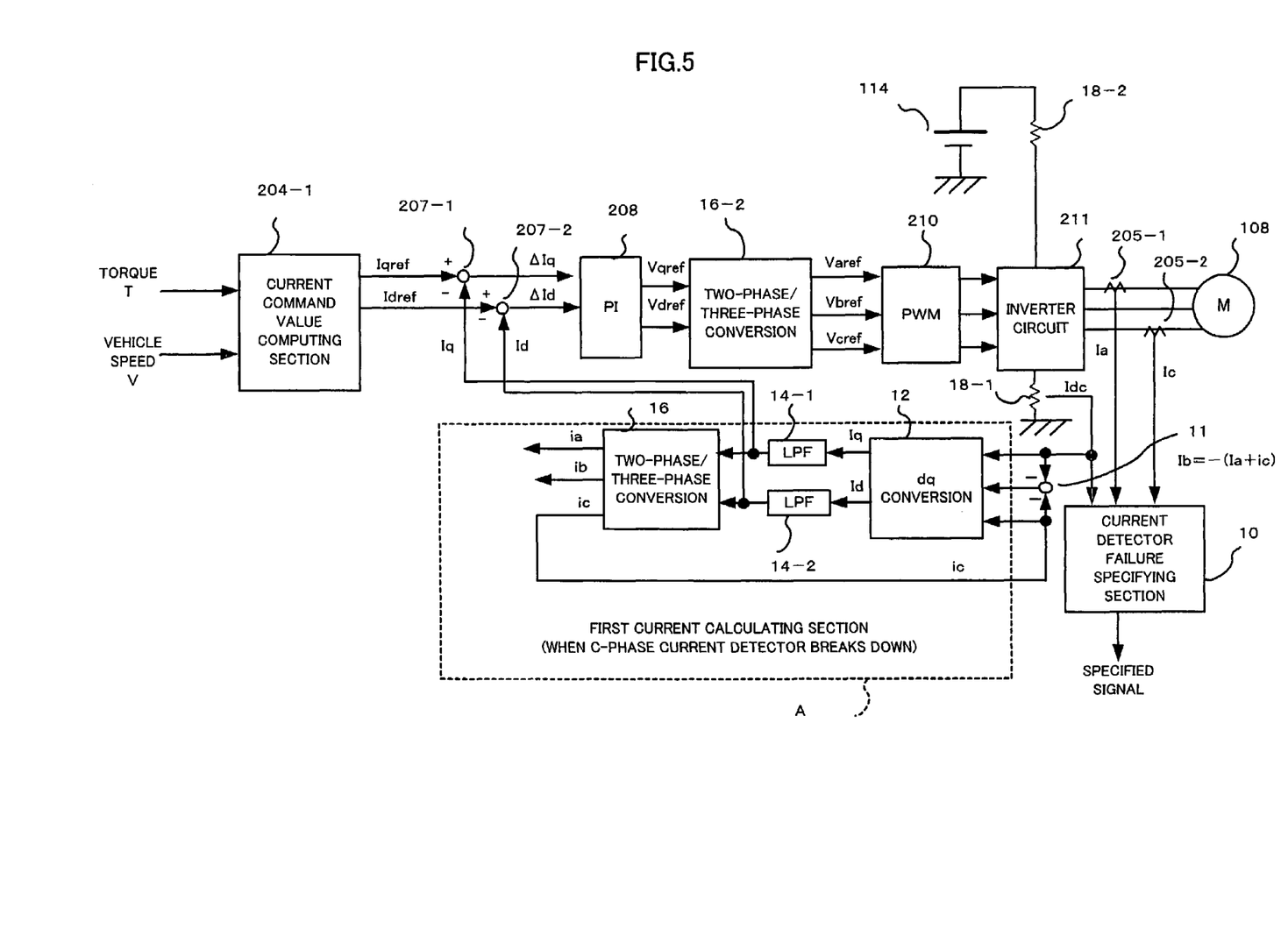
FIG. 5 is a block diagram illustrating d-q control feed-back control system according to one embodiment of the present invention.

As a modified example of the embodiment-1, the present invention can be applied to the d-q axes control other than the case where the three-phase motor is controlled according to the respective phases. FIG. 5 is a diagram illustrating the modified example. In FIG. 5, a current command value computing section 204-1 calculates d-q axes current command values Iqref and Idref. On the other hand, the low pass filters 14-1 and 14-2 calculate the q-axis current Iq and the d-axis current Id, and the subtracting sections 207-1 and 207-2 calculate deviations ΔIq and ΔId. The PI control section 208 inputs the deviations ΔIq and ΔId thereinto so as to calculate voltage command values Vqref and Vdref. The voltage command values Vqref and Vdref are converted by the two-phase/three-phase converting section 16-2 so that the phase voltage command values Varef, Vbref and Vcref are calculated. The inverter circuit 211 is PWM-controlled based on the phase voltage command values Varef, Vbref and Vcref.

In such a manner, the present invention can be applied to the case of the d-q axes control, and produce the same effect.

Embodiment-2

Figure 6:
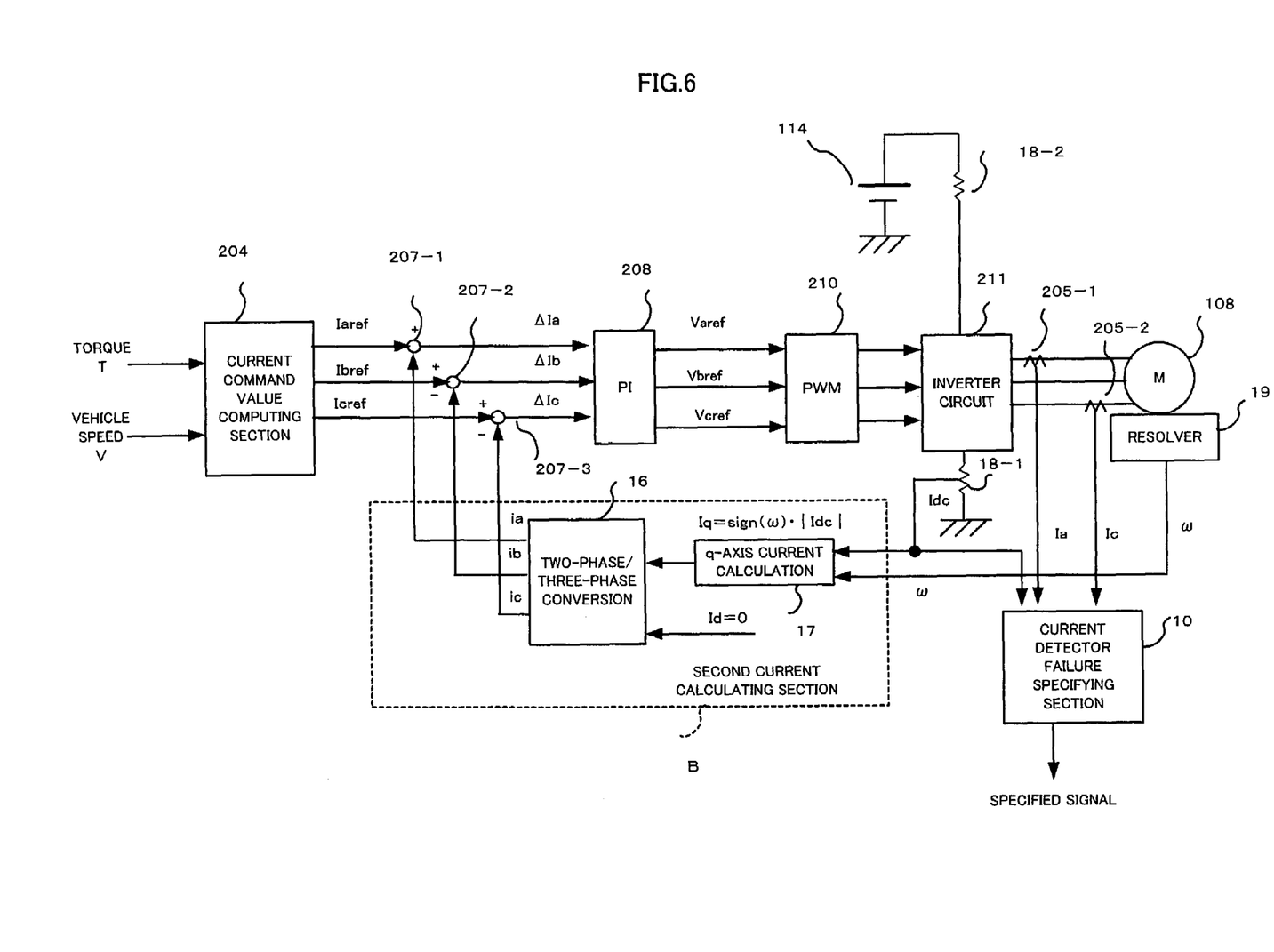
FIG. 6 is a block diagram showing another example of the feed-back control system according to the present invention.

The case where the feed-back control is continued by using the battery current is explained below with reference to FIG. 6. In FIG. 6, the battery current Idc detected by the battery current detector 18-1 is inputted into a second current calculating section B surrounded by a broken line. The second current calculating section B is composed of a q-axis current calculating section 17 that calculates the q-axis current Iq by coding the battery current Idc, namely, Iq=sign(ω)·|Idc|, and the two-phase/three-phase converting section 16 as the two-phase/three-phase converting means that inputs Iq and the d-axis current Id of "0" (Id=0). The q-axis current calculating section 17 obtains the battery current Idc which is coded according to a rotational direction of the motor 108, and after calculating a code sign (ω) representing the rotational direction of the motor and a value |Idc| of the battery current Idc, multiplies them, so as to output the q-axis current Iq=sign(ω)·|Idc|. The rotational direction of the motor 108 may be obtained in such a manner that the angular speed CL) of the motor 108 is detected by a resolver 19 as a rotational speed detecting means (or hole sensor, hole IC or the like) and its code sign (ω) is obtained. The two-phase/three-phase converting section 16 which inputs the q-axis current Iq and the d-axis current Id therein calculates calculated phase currents ia, ib and ic.

The reason why the phase currents can be calculated by the second current calculating section B having such a constitution that the battery current Idc is a direct current and the q-axis current Iq is a current for forming an output torque of the motor. Since the d-axial current is zero current as long as weak field control or the like is not made, Idc=Iq and Id=0 can be related.

The phase currents ia, ib and ic calculated by the two-phase/three-phase converting section 16 are inputted into the subtracting sections 207-1, 207-2 and 207-3 instead of the detected currents Ia, Ib and Ic in the case where the current detector 205-2 is normal, so that the feed-back control can be continued.

In the case where the feed-back control is made by using the battery current, particularly if the control is switched into the feed-back control using the battery current as a result of the failure current detector 205-1 or 205-2, after the output is stopped, the output is gradually increased, so that the maximum current is limited like the control system shown in FIG. 4. In this case, the safety of the electric power steering apparatus can be further secured.

Embodiment-3

Figure 7:
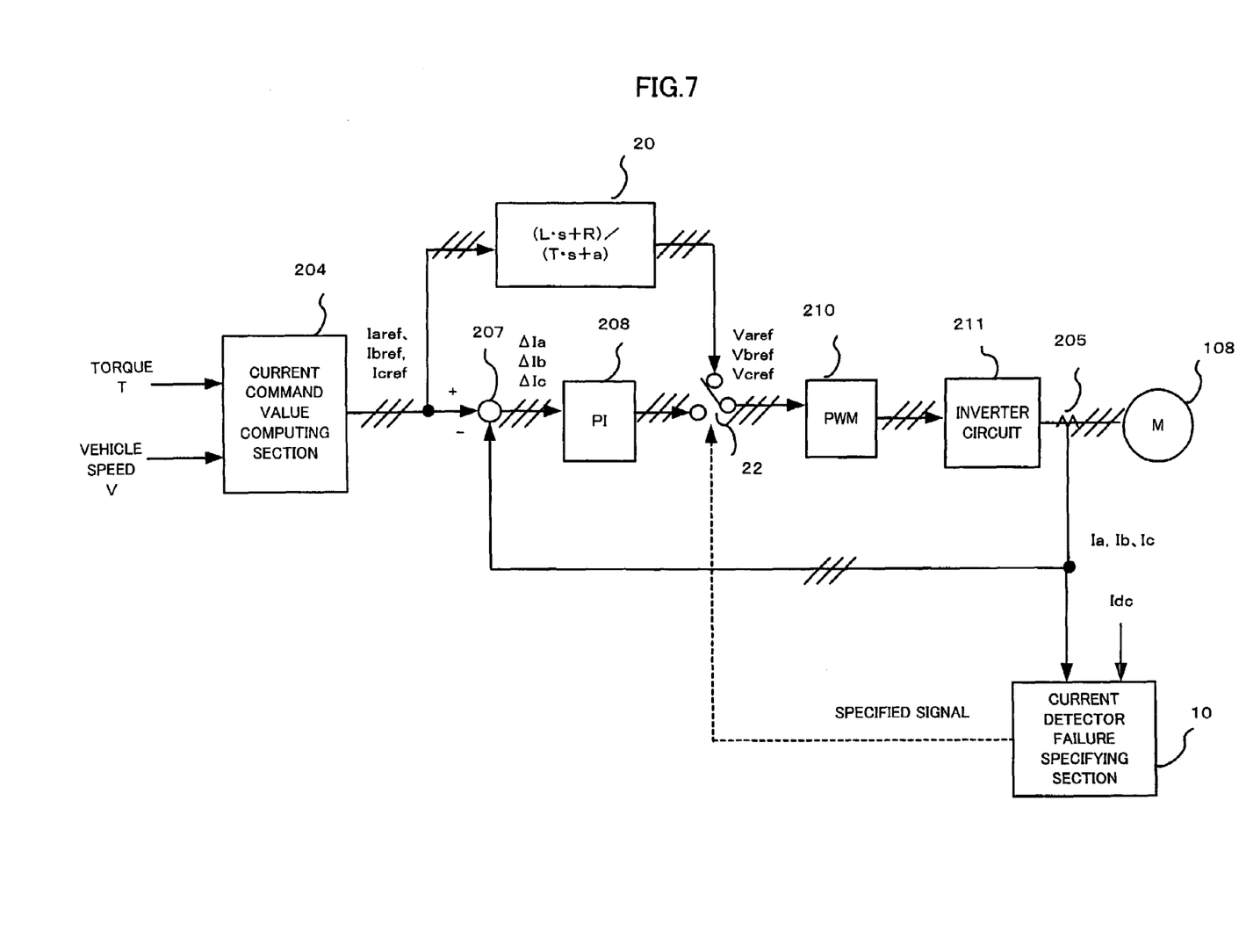
FIG. 7 is a block diagram showing an example of a feed-forward control system according to the present invention.

When all the phase current detectors 205-1 and 205-2 of the motor and the battery current detector 18-1 are determined as abnormal, the feed-back control cannot be continued. In this case, the control is switched into the feed-forward control. This embodiment-3 is explained with reference to FIG. 7. In FIG. 7, the current command value Iref is inputted into a leading/delay computing section 20, and the voltage command value Vref is calculated. As one example of the function, (L·s+R)/(T·s+a) is used. The numeral "L" designates an inductance value of the motor 108, "R" designates a resistance of the motor 108, "1/T" designates a break frequency, and "a" designates a constant. When all the phase current detectors 205-1 and 205-2 of the motor and the battery current detector 18-1 break down, a switch 22 is turned by a specified signal from the current detector failure specifying section 10 so that the feed-back control is switched into the feed-forward control.

With such a constitution, in the case of the feed-forward control, since the control can be made without requiring a detected current of the current detector, the assist can be continued. Since, however, the respective currents are not monitored, the output characteristics should be as shown in FIG. 4 from the viewpoint of the safety of apparatus. That is to say, when the feed-back control is switched into the feed-forward control, the output is once set to zero and then the output is gradually increased, and the maximum output should be limited in comparison with the maximum output in the case where the current detectors are normal.

Embodiment-4

Figure 8:
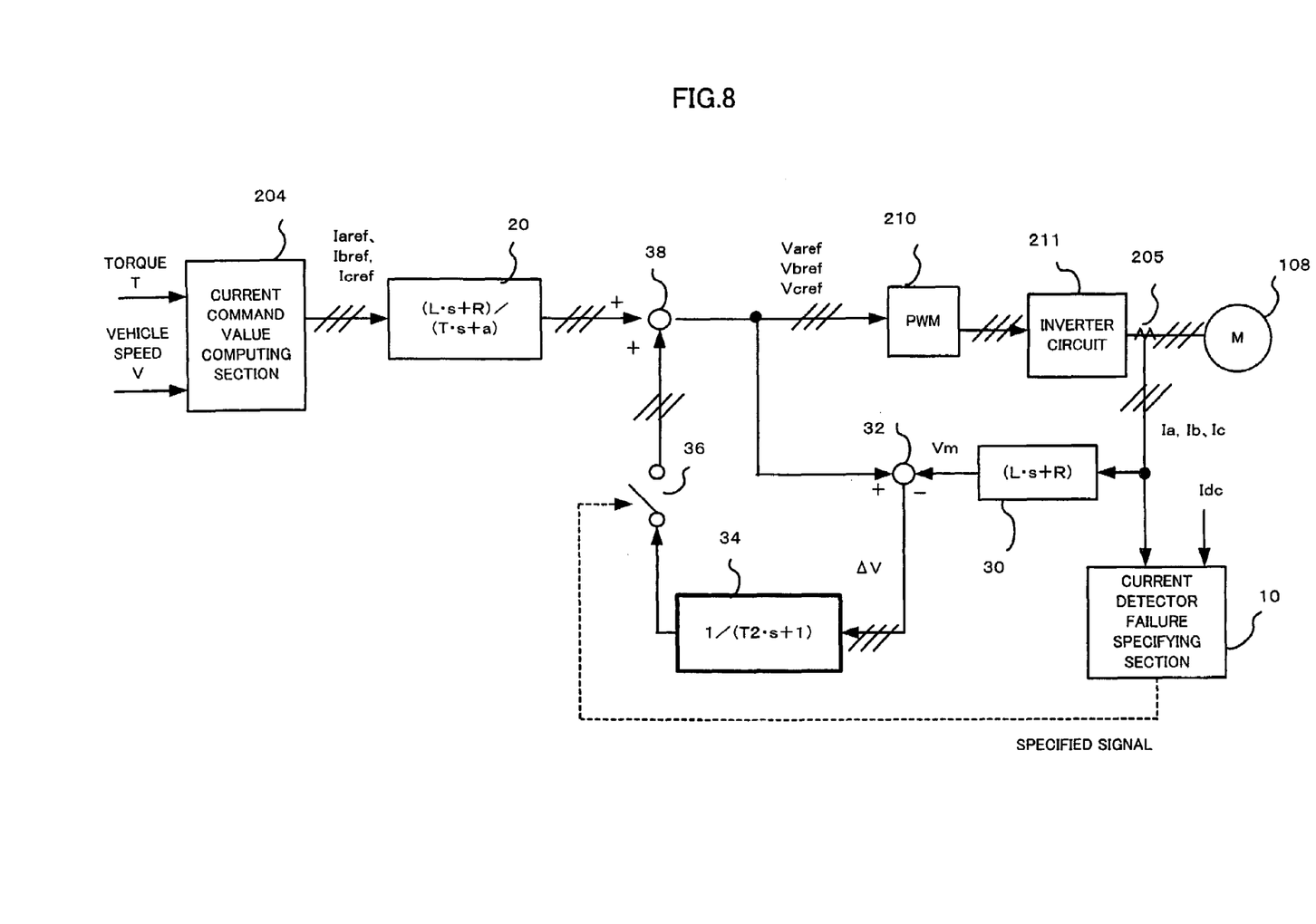
FIG. 8 is a block diagram illustrating the feed-forward control system to which a disturbance observer is added according to another embodiment of the present invention.

In the electric power steering apparatus having the feed-forward control and disturbance observer constitution shown in FIG. 8, when a determination is made that all the current detectors are not normal, a disturbance observer is separated off, so that the control can be continued.

In FIG. 8, the current command values Iaref, Ibref and Icref output from the current command value computing section 204 are inputted into the leading/delay computing section 20. On the other hand, as to the disturbance observer, the motor currents Ia, Ib and Ic detected by the current detectors 205-1 and 205-2 are outputted as the phase motor voltage Vm from a transfer function section 30 having a transfer function (L·s+R) composed of a winding wire resistance R and an inductance L as a model of the motor 108. The subtracting section 32 outputs phase deviations ΔV between the phase voltage command values Varef, Vbref and Vcref, mentioned later, and the phase motor voltage Vm. The phase deviations ΔV are inputted into a transfer function section 34 having a primary delay function "1/(T2·s+1)", and these phase outputs are sent to an adding section 38 via a switch 36 to be controlled by a specified signal from the current detector failure specifying section 10. The adding section 38 adds the phase outputs from the transfer function section 34 and the phase outputs from the leading/delay computing section 20, so as to calculate the phase voltage command values Varef, Vbref and Vcref. The inverter circuit 211 which is PWM-controlled based on the phase voltage command values Varef, Vbref and Vcref supplies the motor current to the motor 108.

In the control block diagram illustrating such a constitution, when the current detector 205-1 or 205-2 breaks down, the phase currents ia, ib and ic are calculated based on the embodiment 1, so that the disturbance observer control can be continued. Even if the the current detector 205-1 or 205-2 breaks down, when the current detector 18-1 or 18-2 is normal, the phase currents can be calculated based on the embodiment 2, so that the disturbance observer control can be continued by using the calculated currents. When all the current detectors 205-1, 205-2, 18-1 and 18-2 break down, the switch 36 is released, and the disturbance observer control is relinquished so that only Feed-forward control is continued.

In such a manner, the present invention can be applied also to the combination of the feed-forward control and the disturbance observer control, and even if some current detectors breaks down, the phase currents are calculated so that the control can be continued by using the phase currents.

As explained above, according to the present invention, even if some current detectors break down, the phase currents are calculated from the currents detected by the residual normal current detectors, so that the electric power steering apparatus can be continued to be controlled. For this reason, the electric power steering apparatus which has comparatively good feeling of steering and is safe can be provided. In the case where the feedback control is made, when a determination is made that not all the current detectors are normal, even if the control is switched from the feed-back control into the feed-forward control, the maximum output current is limited. For this reason, an excess current does not flow in the motor or the like, and thus the safe electric power steering apparatus can be provided.

According to the electric power steering apparatus of the present invention, the phase currents of the three-phase motor are calculated from a phase current for one phase detected by one normal current detector, and the control of the electric power steering apparatus can be continued. For this reason, the electric power steering apparatus which has comparatively good feeling of steering and is safe can be provided.

Further, since the phase currents of the three-phase motor can be calculated from the battery current, the control of the electric power steering apparatus can be continued. The electric power steering apparatus which has comparatively good feeling of steering and is safe can be provided.

Further, when a determination is made not all the current detectors are normal, even if the feedback control is switched into the feed-forward control, the maximum output current is limited. For this reason, an excess current does not flow in the motor or the like, and thus the safe electric power steering apparatus can be provided.

What is claimed is:

1. An electric power steering apparatus which includes a three-phrase motor that supplies a steering assist power to a vehicle steering system, a torque sensor that detects a steering power to affect a handle, and at least two current detectors that detect phase currents of the three-phase motor, and controls an electric current of the three-phase motor based on a current command value determined based on an output value from the torque sensor and the electric current of the three-phase motor, comprising:
a current detect or failure specifying section that specifies a failure current detector and a normal current detector when the current detector breaks down; and
a first current calculating section that calculates the phase currents of the three-phase motor from a detected current for one phase detected by the normal current detector, wherein
the electric current of the motor is continued to be controlled based on the calculated phase currents,
the first current calculating section includes a three-phase/two-phase converting section that inputs the detected current for one phase detected by the normal current detector and an estimated current for at least one phase which is substituted for a detected current of the failure current detector therein, two low pass filters that are arranged at an output of the three two-phase converting section, and a two-phase/three-phase converting section that inputs the outputs from the low pass filters therein,
an electric current corresponding to the estimated current in the three-phase currents as an output from the two-phase/three-phase converting section is feed-backed as the estimated current.

2. An electric power steering apparatus which includes a three-phase motor that supplies a steering assist power to a vehicle steering system, a torciue sensor that detects a steering power to affect a handle and at least two current detectors that detect phase currents of the three-phase motor, and controls an electric current of the three-phase motor based on a current command value determined based on an output value from the torque sensor and the electric current of the three-phase motor, comprising:
a battery current detector that detects an electric current to be supplied from a battery power source for driving the three-phase motor; and
a second current calculating section that calculates the phase currents of the three-phase motor from the battery current, wherein
the electric current of the three-phase motor is controlled based on the calculated phase currents for three phases,
the second current calculating section is a two-phase/three-phase converting section that inputs a q-axis current as the battery current and a d-axis current as zero current therein.

3. An electric power steering apparatus which includes a three-phase motor that supplies a steering assist power to a vehicle steering system, a torque sensor that detects a steering power to affect a handle and at least two current detectors that detect phase currents of the motor, and controls an electric current of the motor to be feed-backed based on a current command value determined based on an output value from the torque sensor and the electric current of the three-phase motor, comprising:
a battery current detector that detects an electric current to be supplied from a battery power source for driving the three-phase motor,
wherein when a determination is made that not all the current detectors of the three-phase motor and the battery current detector are normal, the feed-back control is switched into a feed-forward control based on the current command value.

4. An electric power steering apparatus according to claim 3, wherein the feed-forward control is made, a maximum output current value is limited to be smaller than a maximum output current value of the three-phase motor in the case where the phase currents of the three-phase motor are detected by the current detectors and are controlled to be feed-backed.

5. An electric power steering apparatus which includes a three-phase motor that supplies a steering assist power to a vehicle steering system, a torque sensor that detects a steering power to affect a handle and at least two current detectors that detect phase currents of the three-phase motor, and controls an electric current of the three-phase motor based on a current command value determined based on an output value from the torque sensor and the electric current of the three-phase motor, comprising:

a battery current detector that detects an electric current to be supplied from a battery power source for driving the three-phase motor; and     a second current calculating section that calculates the phase currents of the three-phase motor from the battery current, wherein     the electric current of the three phase motor is controlled based on the calculated phase currents for three phases,     when the electric current of the three-phase motor is controlled based on the calculated currents in the second current calculating section, the phase currents of the three-phase motor are detected by the current detectors, and a maximum output current value of the three-phase motor is limited to be smaller than a maximum output current value of the motor in the case where the electric current of the motor is controlled based on the detected currents.

6. An electric power steering apparatus which includes a three-phase motor that supplies a steering assist power to a vehicle steering system, a torque sensor that detects a steering power to affect a handle and at least two currents detectors that detect phase currents of the three-phase motor, and controls an electric current of the three-phase motor based on a current command value determined based on an output value from the torque sensor and the electric current of the three-phase motor, comprising:

a battery current detector that detects an electric current to be supplied from a battery power source for driving the three-phase motor; and     a second current calculating section that calculates the phase currents of the three-phase motor from the battery current, wherein     the electric current of the three phase motor is controlled based on the calculated phase currents for three phases,     the second current calculating section is a two-phase/three-phrase converting section that inputs a q-axis current as the battery current and a d-axis current as zero current therein,     when the electric current of the three-phase motor is controlled based on the calculated currents in the second current calculating section, the phase currents of the three-phase motor are detected by the current detectors, and a maximum output current value of the three-phase motor is limited to be smaller than a maximum output current value of the motor in the case where the electric current of the motor is controlled based on the detected currents.

\* \* \* \* \*